(12) United States Patent
Feng et al.

(10) Patent No.: US 7,417,810 B2
(45) Date of Patent: Aug. 26, 2008

(54) LENS MODULE WITH SHIELDING LAYER

(75) Inventors: Chen Feng, Snohomish, WA (US); Ming Lee, Miao-Li Hsien (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 0 days.

(21) Appl. No.: 11/617,135

(22) Filed: Dec. 28, 2006

(65) Prior Publication Data

US 2008/0019026 A1 Jan. 24, 2008

(30) Foreign Application Priority Data

Jul. 21, 2006 (CN) .................... 2006 1 0061744

(51) Int. Cl.
*G02B 7/02* (2006.01)
(52) U.S. Cl. .................... 359/819; 359/811
(58) Field of Classification Search ............. 359/811, 359/819–823, 694, 704
See application file for complete search history.

(56) References Cited

U.S. PATENT DOCUMENTS 6,903,883 B2 * 6/2005 Amanai .................. 359/819
2006/0126194 A1 * 6/2006 Kazama .................. 359/811

* cited by examiner

*Primary Examiner*—Mohammed Hasan

(57) ABSTRACT

A lens module (200) includes a barrel (20), a lens (30) and a shielding layer (51). The barrel includes a screening end (21) and a mounting end (22) positioned opposite to the screening end, and defines an aperture (23) in the screening end. A diameter of the aperture reduces in a direction from the screening end to the mounting end so that the aperture has a large diameter and a small diameter. The lens is received in the barrel. The shielding layer made of an opaque film is mounted on the screening end and defines a receiving hole (511) aligned with the aperture. The receiving hole has a diameter being in a range of the large diameter and the small diameter.

17 Claims, 5 Drawing Sheets

LENS MODULE WITH SHIELDING LAYER

BACKGROUND OF THE INVENTION

1. Field of the Invention

The present invention generally relates to lens modules and, more particularly, to a lens module for an optical device such as a microscope, a camera module, a digital camera module used in a portable electronic device, or such like.

2. Description of Related Art

With the ongoing development of microcircuitry and multimedia technologies, digital cameras are now in widespread use. High-end portable electronic devices, such as mobile phones and personal digital assistants (PDAs), are being developed to be increasingly multi-functional. Many of these portable electronic devices are now equipped with a digital camera module. These electronic devices enable consumers to enjoy capturing digital pictures anytime and anywhere. At the same time, the demand for digital picture quality has become greater and greater.

In a digital camera, a lens module is very important to the quality of the pictures captured by the digital camera. Referring to FIG. 5, a typical lens module 100 includes a barrel 11, a lens 12 and an image sensing module 13. The barrel 11 is a hollow cylinder and includes an inner surface 110, a screening end 111 and a mounting end 112 positioned opposite to the screening end 111. An aperture 113 for receiving optical image signals is defined in a central portion of the screening end 111. The aperture 113 reduces in diameter from the screening end 111 to the mounting end 112, a cone-shaped surface 114 is thus formed on the screening end of the barrel 11 and unwanted light is thus prevented from entering the barrel 11.

The lens 12 is mounted in the barrel 11. The image sensing module 13 includes an image sensor 131, a top board 132 and a base board 133. The image sensor 131 is mounted on the base board 133. The top board 132 is made of transparent material such as glass or plastic. Periphery of the top board 132 is mounted on the base board 133, thus packaging the image sensor 131 between the top board 132 and the base board 133.

In assembly, the image sensing module 13 is mounted on the mounting end 112 of the barrel 11, the image sensor 131 is located in an light-path of the lens 12, and the top board 132 is disposed between the lens 12 and the image sensor 131. In use, light enters the barrel 11 from the aperture 113 and is focused by the lens 12 to form an object image on the image sensor 131.

However, when using the lens module 100, some stray light is likely to enter the barrel 11 and interferes with the object image formed on the image sensor 131. For example, some stray light A that is transmitted near the cone-shaped surface 114 and is approximately parallel to the cone-shaped surface 114 may enter the barrel 11 via the aperture 113. The light A reaches the inner surface 110 and is reflected to the image sensor 131 by the inner surface 110. Some stray light B and C that is transmitted to an area near a center of the aperture 113 may enter the barrel 11. Wherein the light B is reflected to the image sensor 131 by the inner surface 110. The light C is reflected to the inner surface 110 by the base board 133, and then reflected to a surface of the lens 12 by the inner surface 110, and is finally reflected to the image sensor 131 by the surface of the lens 12. The light A, B and C can interfere with the object image formed on the image sensor 131.

Therefore, an improved lens module is desired in order to overcome the above-described shortcomings.

SUMMARY OF THE INVENTION

In a preferred embodiment thereof, a lens module includes a barrel, a lens and a shielding layer. The barrel includes a screening end and a mounting end positioned opposite to the screening end, and defines an aperture in the screening end. The lens is received in the barrel adjacent the screening end. The shielding layer is mounted on the screening end and defines a receiving hole aligned with the aperture.

Other advantages and novel features will become more apparent from the following detailed description when taken in conjunction with the accompanying drawings.

BRIEF DESCRIPTION OF THE DRAWINGS

Many aspects of the lens module can be better understood with reference to the following drawings. The components in the drawings are not necessarily drawn to scale, the emphasis instead being placed upon clearly illustrating the principles of the lens module. Moreover, in the drawings, like reference numerals designate corresponding parts through out the several views.

DETAILED DESCRIPTION OF THE INVENTION

Figure 1:
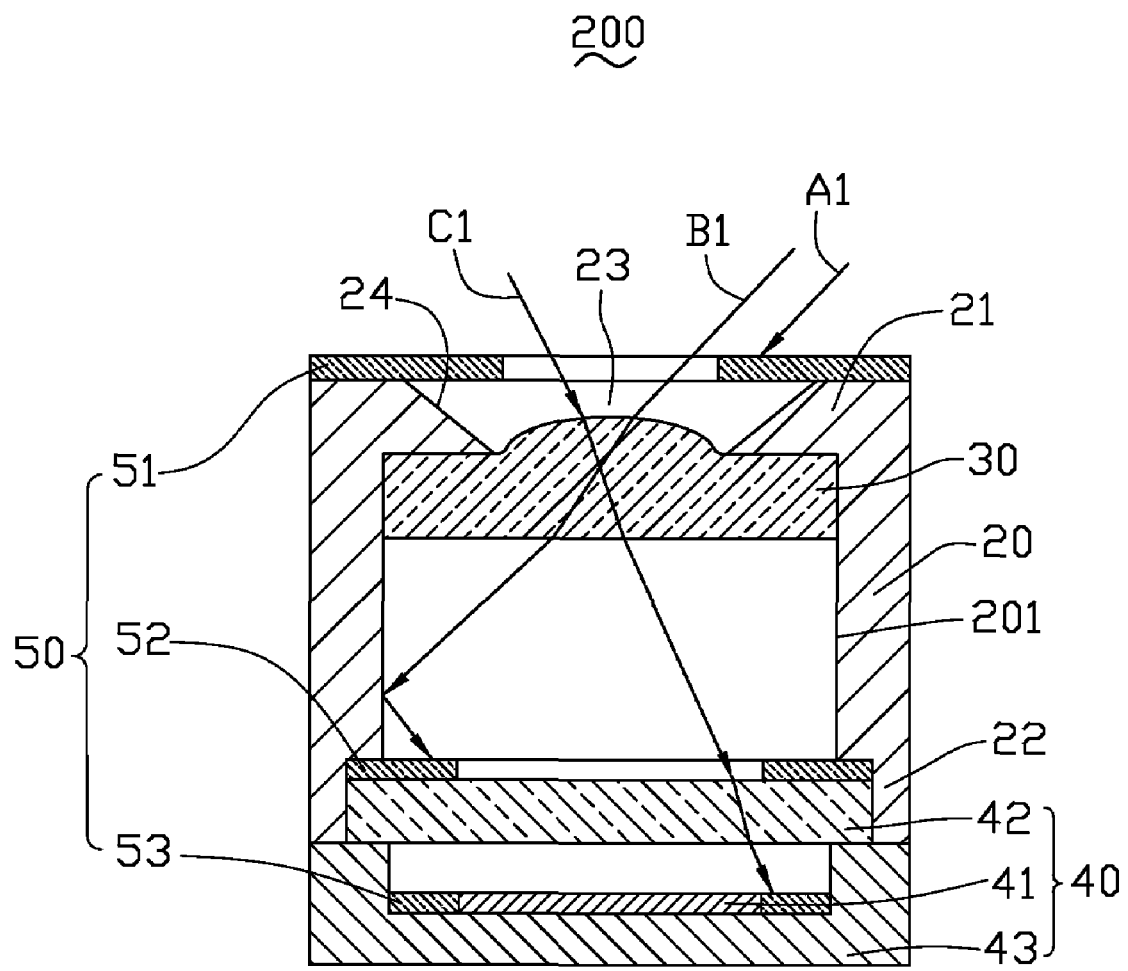
FIG. 1 is schematic, cross-sectional view of a lens module in accordance with a preferred embodiment of the present invention.

Referring now to the drawings in detail, FIG. 1 shows a lens module 200 in accordance with a preferred embodiment of the present invention. The lens module 200 includes a barrel 20, a lens 30, an image sensing module 40 and a shielding member 50. The lens 30 is mounted in the barrel 20. The image sensing module 40 is mounted to an end of the barrel 20. The shielding member 50 is attached to the barrel 20 and the image sensing module 40.

The barrel 20 is a substantially hollow cylinder, and includes an inner surface 201, a screening end 21 and a mounting end 22 positioned opposite to the screening end 21. The barrel 20 has an aperture 23 defined in a centre of the screening end 21. The aperture 23 has a diameter reducing in a direction from the screening end 21 to the mounting end 22, thereby forming a cone-shaped surface 24 on the screening end 21.

The lens 30 is mounted to the barrel 20, and has an optical center aligned with a center of the aperture 23. Understandably a plurality of lenses 30 can also be mounted in the barrel 20.

The image sensing module 40 includes an image sensor 41, a top board 42 and a base board 43. The image sensor is mounted on the base board 43. The top board 42 is made of a transparent material such as glass or plastic. The top board 42 is mounted with its periphery resting on the base board 43, thus packaging the image sensor 41 between the top board 42 and the base board 43.

Figure 2:
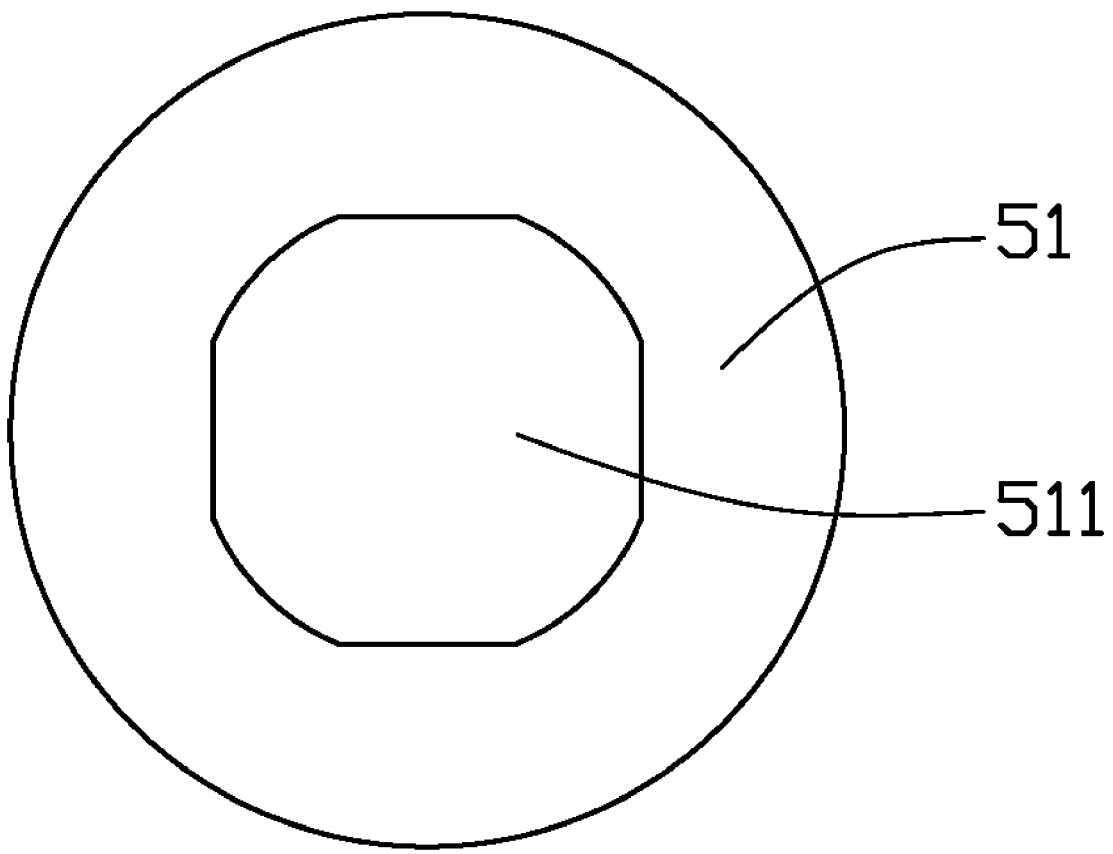
FIG. 2 is a schematic, top view of a shielding layer of the lens module shown in FIG. 1.
Figure 3:
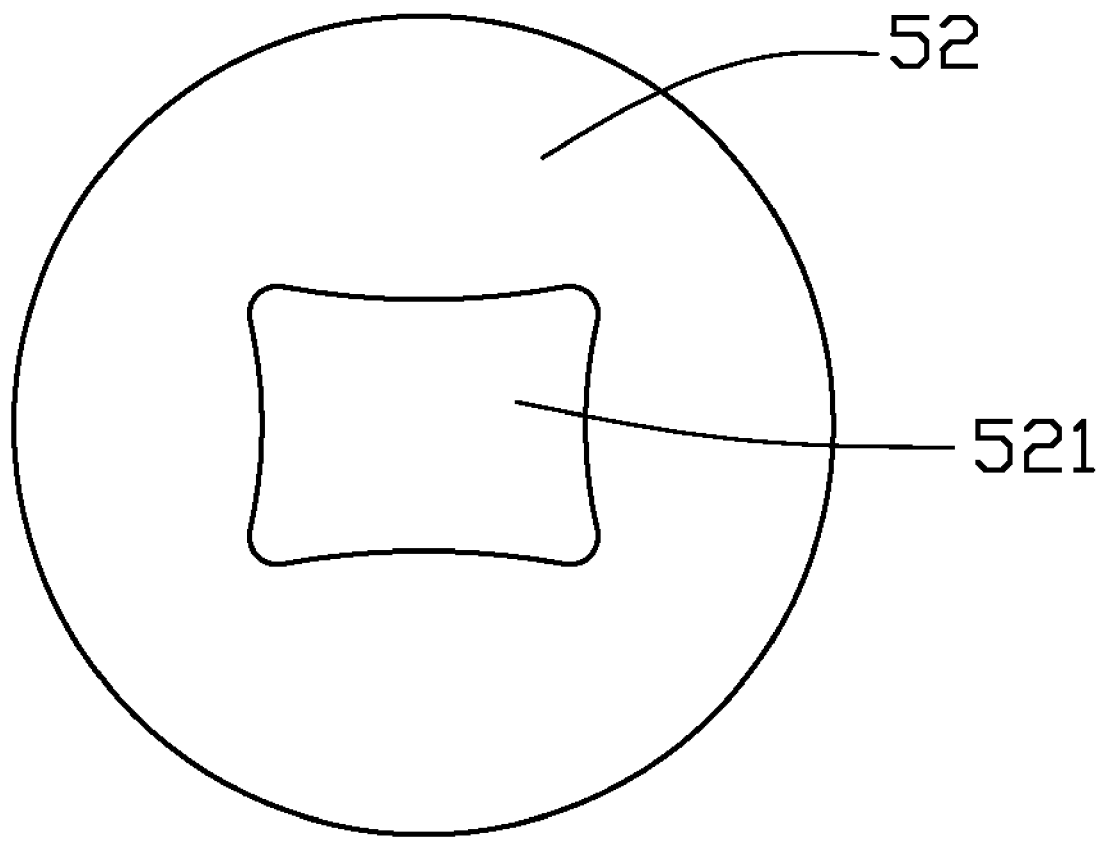
FIG. 3 is a schematic, top view of a first absorbing layer of the lens module shown in FIG. 1.
Figure 4:
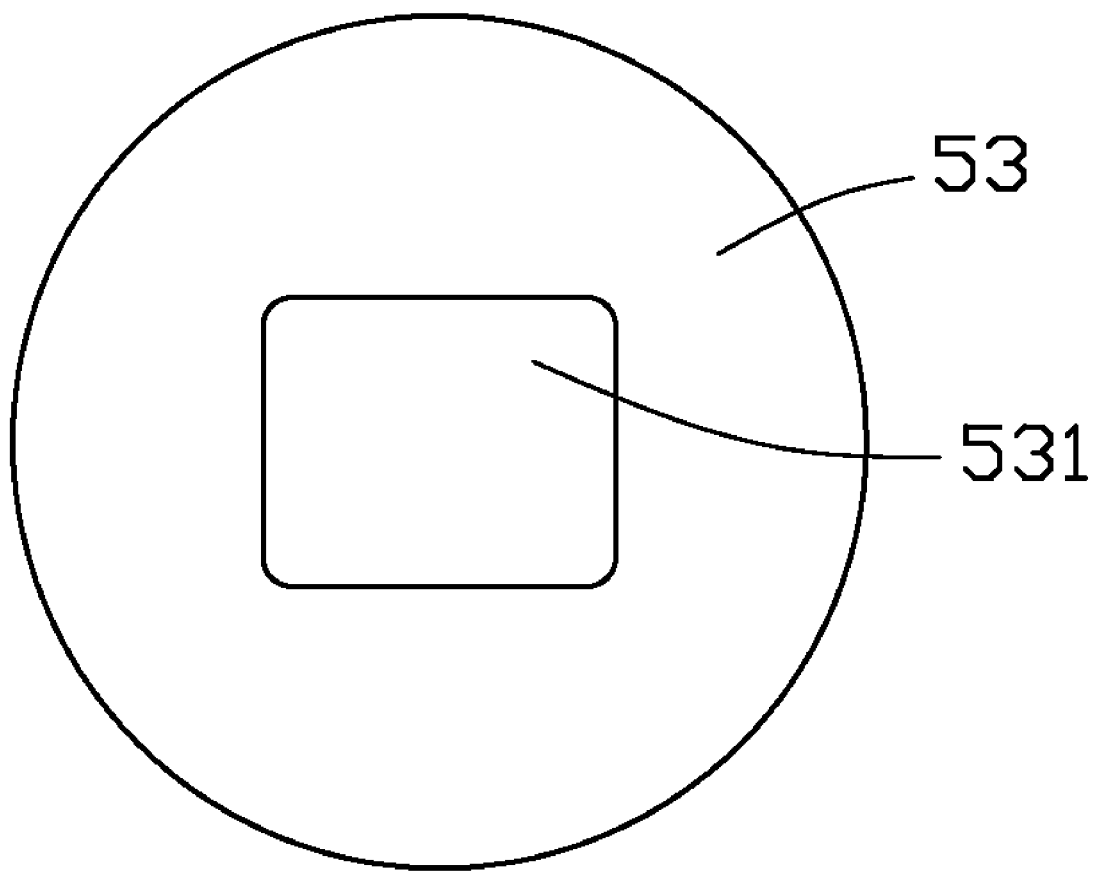
FIG. 4 is a schematic, top view of a second absorbing layer of the lens module shown in FIG. 1.
Figure 5:
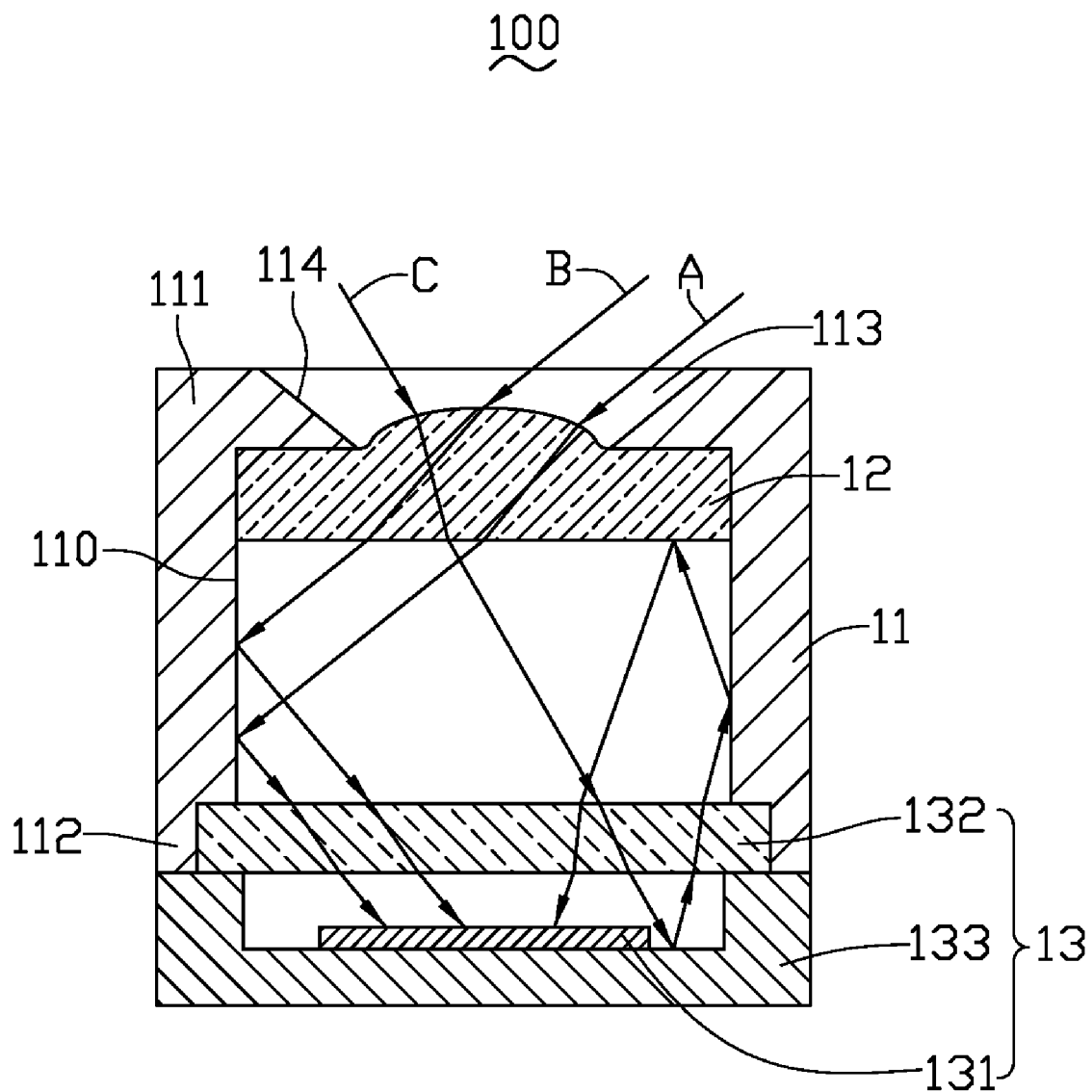
FIG. 5 is a schematic, cross-sectional view of a typical lens module.

Also referring to FIGS. 2 to 4, the shielding member 50 includes a shielding layer 51, a first absorbing layer 52 and a second absorbing layer 53. The shielding layer 51 is made of an opaque film. The first absorbing layer 52 and the second absorbing layer 53 are made of opaque films formed by materials having high absorptivity and low reflectivity, such as black printing ink coat or black adhesive tape.

The shielding layer 51 is mounted on the screening end 21. A receiving hole 511 is defined in a center portion of the shielding layer 51. The receiving hole 511 is approximately round and has four linear sides, and four circular arcs. The linear sides and the circular arcs are connected together in alternating fashion. Each side is parallel to its opposite side and perpendicular to its two adjacent sides. The receiving hole 511 prevents stray light entering the lens module 200 whilst allowing image light to enter. A diameter of the receiving hole 511 is less than that of the aperture 23 away from the mounting end 22, and approximately equal to that of the aperture 23 near the mounting end 22.

The first absorbing layer 52 is mounted on periphery of a surface towards the lens 20 of the top board 42. A passing hole 521 is defined in a center portion of the first absorbing layer 52. The passing hole 521 is approximately rectangular having curving sides and corners. This figure can prevent more unnecessary optical signals and receive more necessary optical signals.

The second absorbing layer 53 is mounted on periphery around the image sensor 41 of the base board 43. A containing hole 531 is defined in a center of the second absorbing layer 53. The containing hole 531 is approximately rectangular and has a dimension approximately equal to that of the image sensor 41. This shape of the containing hole 531 is prone to prevent stray light from entering the lens module 200, whilst allowing image light to enter. The image sensor 41 is tightly surrounded in the containing hole 531 by the second absorbing layer 53, and there is no exposed portion of the base board 43 between the image sensor 41 and the second absorbing layer 53.

In assembly, The image sensing module 40 is mounted on the mounting end 22 of the barrel 20. The image sensor 41 is disposed in a light-path of the lens 30, and the top board 42 is positioned between the lens 30 and the image sensor 41.

In the aforementioned lens module 200, because a diameter of the receiving hole 511 is less than the diameter of the aperture 23 away from the mounting end 22, the shielding layer 51 prevents stray light A1 transmitted near the cone-shaped surface 24 and running approximately parallel to the cone-shaped surface 24 entering the lens module 200. Some stray light B1 transmitted near a center of the aperture 23 enters the barrel 20 and is reflected to the first absorbing layer 52 by the inner surface 201, and the first absorbing layer 52 absorbs the light B1. Some stray light C1 transmitting near a center of the aperture 23 enter the barrel 20 and reaches the second absorbing layer 53 on the base board 43, and the second absorbing layer 53 absorbs the light C1. Therefore, the stray light A1, B1, and C1 cannot reach the image sensor 41, and the imaging quality of the lens module 200 is thus improved.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. A lens module comprising:
   a barrel including a screening end and a mounting end positioned opposite to the screening end, and defining an aperture in the screening end;
   a lens being received in the barrel adjacent the screening end; and
   a shielding layer being mounted on the screening end and defining a receiving hole aligned with the aperture.

2. The lens module as claimed in claim 1, wherein, the receiving hole is round.

3. The lens module as claimed in claim 2, wherein a diameter of the aperture reduces in a direction from the screening end to the mounting end, thus forming a cone-shaped surface surrounding the aperture in the screening end; a diameter of the receiving hole is approximately equal to a diameter of the aperture near the mounting end.

4. The lens module as claimed in claim 3, further comprising an image sensing module, wherein the image sensing module is mounted on the mounting end and includes an image sensor, a top board and a base board; the image sensor is mounted on the base board and disposed in an emitting light path of the lens, the top board is made of transparent materials and mounted on the base board, and the image sensor is packaged between the top board and the base board.

5. The lens module as claimed in claim 4, wherein a first absorbing layer is mounted on periphery of the top board.

6. The lens module as claimed in claim 5, wherein a passing hole is defined in a center portion of the first absorbing layer, the passing hole is rectangular.

7. The lens module as claimed in claim 5, wherein the lens module includes a second absorbing layer, the second absorbing is mounted on a periphery around the image sensor of the base board.

8. The lens module as claimed in claim 7, wherein a containing hole is defined in a center of the second absorbing layer, the containing hole is rectangular and has a dimension equal to that of the image sensor, and the image sensor is tightly and interferentially received in the containing hole of the second absorbing layer.

9. The lens module as claimed in claim 4, wherein an absorbing layer is mounted on a periphery around the image sensor of the base board.

10. The lens module as claimed in claim 9, wherein a containing hole is defined in a center of the absorbing layer, the containing hole is rectangular and has a dimension equal to that of the image sensor, and the image sensor is tightly and interferentially received in the containing hole of the absorbing layer.

11. A lens module, comprising:
    a barrel;
    a lens being received in the barrel;
    an image sensing module being mounted on an end of the barrel, the image sensing module including an image sensor, a top board and a base board; the image sensor being mounted on the base board and disposed in a light-path of the lens, the top board being mounted on the base board, and the image sensor being packaged between the top board and the base board;
    a first absorbing layer being mounted on the top board and defining a passing hole aligned with the lens and the image sensor; and
    a second absorbing layer being mounted on periphery around the image sensor of the base board.

12. The lens module as claimed in claim 11, wherein the first absorbing layer is mounted on periphery of the top board, and the passing hole is defined in a center portion of the first absorbing layer and is rectangular.

13. The lens module as claimed in claim 11, wherein a containing hole is defined in a center of the second absorbing layer, the containing hole is rectangular and has a dimension equal to that of the image sensor, and the image sensor is tightly surrounded in the second absorbing layer.

14. A lens module, comprising:
a barrel;
a lens being received in the barrel;
an image sensing module being mounted on an end of the barrel, the image sensing module including an image sensor, a top board and a base board; the image sensor being mounted on the base board and disposed in a light-path of the lens, the top board being mounted on the base board, and the image sensor being located between the top board and the base board; and
an absorbing layer being mounted on periphery around the image sensor of the base board, the absorbing layer defining a containing hole in a center thereof.

15. The lens module as claimed in claim 14, wherein the containing hole is rectangular and has a dimension equal to that of the image sensor, and the image sensor is tightly surrounded in the absorbing layer.

16. The lens module as claimed in claim 14, wherein the barrel comprises a screening end adjacent which the lens is mounted and a mounting end to which the image sensing module is mounted, the screening end defining an aperture aligned with the lens.

17. The lens module as claimed in claim 16, wherein a diameter of the aperture reduces in a direction from the screening end to the mounting end so that the aperture has a large diameter and a small diameter, and a shielding layer made of an opaque film is overlapped on a side of the screening end opposing the mounting end, the shielding layer defining a receiving hole aligned with the aperture, the receiving hole having a diameter being in a range of the large diameter and the small diameter.

\* \* \* \* \*